3,408,325
ROOM TEMPERATURE VULCANIZABLE ORGANOPOLYSILOXANE ELASTOMERS
Paul Hittmair, Siegfried Nitzsche, Manfred Wick, and Ernst Wohlfarth, Burghausen, Upper Bavaria, Germany, assignors to Wacker-Chemie G.m.b.H., Munich, Germany
No Drawing. Filed Feb. 13, 1967, Ser. No. 615,320
Claims priority, application Germany, Feb. 11, 1966, W 40,925
13 Claims. (Cl. 260—46.5)

ABSTRACT OF THE DISCLOSURE

A room temperature vulcanizable silicone rubber stock based on a mixture of a siloxane polymer prepared by reacting a hydroxyl endblocked diorganopolysiloxane with the reaction product of a diorganodihalogenosilane with ammonia or certain amines and certain amino substituted organosilanes.

Background of the invention

This invention is in the field of room temperature vulcanizing (RTV) silicone elastomer materials and introduces a novel polymer-crosslinking system.

The recent developments in room temperature vulcanizing silicone rubber stocks have been directed to both the polymer employed and the curing catalysts and crosslinking agents. In general, it is known that certain siloxane polymers having reactive groups bonded to silicon are chemically active toward crosslinking agents in the presence of certain catalysts. These materials cure spontaneously upon mixing and cannot be packaged in a single package hence they are called two-component RTV silicone rubber stocks. In contrast, it is also known that certain siloxanes, particularly hydroxyl endblocked dimethylsiloxanes, can be admixed with certain trifunctional silanes such as alkyltriacyloxysilanes and the mixture is stable until it is exposed to water such as atmospheric water vapor whereupon the material will cure. These materials can be packaged in a single package and do not require further processing by the ultimate consumer and are known as one-component RTV silicone rubber stocks. The present invention is directed to a one-component RTV silicone rubber stock.

The known one-component RTV silicone rubber stocks include mixtures of diorganopolysiloxanes having reactive endgroups or endblockers and aminosubstituted organic silicon compounds having at least three hydrolyzable groups per molecule. These mixtures are known as "amino one-component systems." The amino one-component systems have heretofore suffered the disadvantage of short storage life unless extreme measures are taken to completely exclude water from the ingredients and storage package. The expense incurred in completely drying fillers and other ingredients has inhibited the commercial exploitation of the amino one-component systems. Other disadvantages of the amino one-component systems have included indifferent adhesion to substrates, relatively poor tear strength and the impossibility of preparing such a system which would cure to form a transparent elastomer.

The object of this invention is to introduce a new room temperature vulcanizing silicone rubber composition. A further object is to introduce an amino one component system which is less sensitive to the presence of moisture during storage. A further object is an amino one component RTV silicone rubber system exhibiting good adhesion to substrates, good tear resistance and suitable for use in preparing transparent elastomeric products. Other objects and advantages of this invention are detailed in or will be apparent from the disclosure and claims following.

Summary of invention

This invention relates to a one component room temperature vulcanizable silicone rubber stock which can be stored in the substantial absence of moisture and cures in the presence of water vapor characterized in that the stock is a mixture of (A) a diorganopolysiloxane prepared by reacting (1) a hydroxyl-endblocked diorganopolysiloxane with (2) an amino substituted organosilicon compound prepared by reacting (a) a silane of the general formula $R_2SiX_2$ wherein each R is a monovalent hydrocarbon radical, halogenohydrocarbon radical or cyanoalkyl radical and X is a halogen atom with (b) ammonia, a primary amine or a secondary amine, and (B) an amino substituted organosilicon compound having at least three hydrolyzable groups per molecule.

Detailed description of invention

The organopolysiloxanes employed herein are well known articles of commerce fully described in the prior art in such patents as U.S. Patents Nos. 2,843,555; 3,105,061; 3,127,363 and 3,294,732. These organopolysiloxanes are essentially linear polymers having hydroxyl endblockers and can be represented by the general formula $(HO)_x(R_ySiO_{4-y/2})_nH$ where $x$ has an average value of 0.99 to 1.01, $y$ has an average value of 1.99 to 2.01 and $x+y$ is 3.0, each R is a monovalent hydrocarbon, halogenohydrocarbon or cyanoalkyl radical and $n$ has a value of at least 3 and preferably at least 50 and does not exceed about 2,000.

The operable siloxane polymers are essentially linear hence are predominantly (i.e. at least 90 mol percent) $R_2SiO$ units. However, limited proportions, preferably below 5 mol percent and most preferably below 2 mol percent of $RSiO_{3/2}$ units, $R_3SiO_{1/2}$ units and/or $SiO_{4/2}$ units can be present. The closer the polymer approaches the R/Si ratio of 2.0/1 the better the ultimate product with the exception that a softer cured rubber essentially free of extractable, uncured polymeric material can be obtained by admixing diorgano functional siloxane polymers having a functional group on each of the terminal silicon atoms with mono-functional siloxane polymers having a functional group on one of the terminal silicon atoms and the other terminal group being an $R_3SiO_{1/2}$ unit.

In the formulae above, each R can be a monovalent hydrocarbon radical of up to 36 carbon atoms. Best results are achieved with hydrocarbon substituents of 1 to 18 carbon atoms. Examples of the radicals represented by R include alkyl radicals such as methyl, ethyl, n-propyl, isopropyl, dodecyl, octadecyl and myricyl, ($-C_aH_{2a+1}$ where $a$ is 1 to 36); alkenyl radicals such as vinyl, allyl, hexenyl and octadecenyl; cycloalkyl radicals such as cyclobutyl, cyclopentyl, cyclohexyl and cyclooctadecyl; cycloalkenyl radicals such as cyclobutenyl, cyclopentenyl, cyclohexenyl and cyclooctadecenyl; aryl radicals such as phenyl, xenyl, naphthyl and phenanthryl, aralkyl radicals such as benzyl, β-phenylethyl and xylyl, and alkaryl radicals such as tolyl and ethylphenyl.

The substituted hydrocarbon radicals represented by R include halogenohydrocarbon radicals such as o-, m- and p-chlorophenyl, and bromophenyl radicals, α,α,α-trifluorotolyl, 3,3,3-trifluoropropyl, $C_bF_{2b+1}CH_2CH_2-$, $(C_bF_{2b+1})_2CH(CH_2)_c-$ and $(C_bF_{2b+1})_3C(CH_2)_c-$ where $b$ is 1 to 12 and $c$ is 1, 2 or 3, chloro-, fluoro- and bromo-derivatives of the various hydrocarbon radicals set forth in the preceding paragraph as well as cyanoalkyl radicals such as β-cyanoethyl, cyanopropyl, cyano-n-butyl, cyano-n-propyl and omega-cyanooctadecyl. The cyanoalkyl radicals should be present on at least 1 mol percent of the silicon atoms present if any noticeable benefit is to be achieved from their presence.

The best results are achieved when the organic substituents represented by R have less than 19 carbon atoms and particularly with those substituents having less than 9 carbon atoms. Most preferred are the methyl radicals, and next preferred are the phenyl, vinyl, ethyl, propyl and 3,3,3-trifluoropropyl radicals. At least 50 mol percent of the R radicals should be aliphatic hydrocarbon radicals of not more than 4 carbon atoms. Of course, as is usually the case, the R radicals on a single silicon atom can be alike or different and various units in the siloxane chain can be similarly or differently substituted. Homopolymers (e.g. dimethylsiloxane polymers), copolymers (e.g. dimethylsiloxanemethylvinylsiloxane-, phenylmethylsiloxane polymers) and mixtures can be employed. The siloxane polymers employed can vary from relatively mobile fluids (viscosity 50 cs. at 25° C.) to gumlike materials having viscosities in the range of $10^6$ cs. at 25° C. This can be seen from the value of $n$ in the general formula above where $n$ is at least 3 and is preferably at least 50, but can have a value as high as 2,000. The preferred siloxane polymers are those having viscosities in the range from 200 to 200,000 cs. at 25° C.

The hydroxyl endblocked diorganopolysiloxane (1) described above is reacted with (2) the reaction product of (a) a diorganodihalogenosilane of the formula $R_2SiX_2$ wherein each R is a monovalent organic radical as described and illustrated above for the siloxane polymers and each X is a halogen atom and (b) ammonia, a primary amine or a secondary amine. The diorganohalogenosilane contains organic substituents represented in the formula by R and defined above in the discussion of the siloxane polymers employed herein. The symbol X represents halogen atoms and can be fluorine, chlorine, bromine, iodine or astatine, but chlorine is preferred and astatine is so rare as to be inconsequential herein. Typical of the silanes represented by $R_2SiX_2$ are dimethyldichlorosilane, phenylmethyldichlorosilane, diphenyldichlorosilane, diethyldichlorosilane, methylvinyldichlorosilane, 3,3,3-trifluoropropylmethyldichlorosilane, propylmethyldichlorosilane, and equivalent dibromo and diiodosilanes.

The diorganodihalogenosilane is reacted with a basic compound which can be represented by the general formula $NH_pR'_{3-p}$ where R' is a monovalent hydrocarbon radical free of aliphatic unsaturation and $p$ is 1, 2 or 3. Each R' can be any alkyl radical such as methyl, ethyl, propyl, butyl, nonyl and octadecyl, aryl radicals such as phenyl, xenyl, naphthyl and phenanthryl; aralkyl radicals such as benzyl, xylyl and β-phenylethyl; alkaryl radicals such as tolyl and ethylphenyl and cycloalkyl radicals such as cyclobutyl, cyclopentyl, cyclohexyl, cyclooctadecyl, 3,5,5-trimethylcyclohexyl and 2,3,3-triethylcyclohexyl radicals. The R' radicals preferably contain less than 19 carbon atoms and most preferred are those radicals containing less than 13 carbon atoms. Excellent results are achieved with R' radicals selected from n-butyl and cyclohexyl. Basic compounds of the formulae $NH_3$, $NH_2R'$ and $NHR'_2$ are operable herein and the preferred compounds are of the formula $NH_2R'$, i.e. the primary amines.

The reaction of the diorganodihalogenosilane, $R_2SiX_2$, with the amine $NH_pR'_{3-p}$ is carried out under known reaction conditions and procedures. These procedures are set forth in the prior art and can be found, for example, in U.S. Patents Nos. 2,564,674; 2,579,417 and 2,579,418, the disclosures thereof being incorporated herein by this reference. Sufficient of the ammonia or amine is employed to react with all of the halogen atoms in the silane reactant thereby insuring that all of the halogen atoms in said silane are replaced by amino groups. The reaction is carried out at the lowest possible temperature hence between the lowest temperature at which the reaction mixture becomes fluid and room temperature. Good results are achieved between −20° C. and 25° C. and the preferred reaction temperature range is from −10° C. to +10° C. Reaction at low temperature is preferred to minimize side reactions whereby silazanes are produced. The desired products are silamines represented by the formula $R_2Si(NH_{p-1}R'_{3-p})_2$ where R, R' and $p$ are as above defined. However, the byproduced silazanes can be used herein and the silazane need not be separated from the desired silamine prior to use of the reaction product herein.

The reaction of silane (a) with basic compound (b) is carried out in substantial absence of water and preferably in an organic solvent which is inert to the reactants. Best solvents for use herein are toluene, xylene and methylene chloride. The reactants are added to the solvent in any desired order and are stirred and cooled until no more amine salt precipitates thereby indicating the reaction is completed. The amine salts are separated from the reaction product in any desired manner such as filtration. The solvent is removed from the reaction product at the lowest practical temperature hence by distillation under reduced pressure. The residue obtained is the desired reactant (2) for this invention. It should be apparent that mixtures of diorganohalogenosilanes and mixtures of basic compounds as defined can be employed thereby producing mixed silanes for use herein. In short, the reaction requires at least one $R_2SiX_2$ silane and at least one $NH_pR'_{3-p}$.

The amino substituted organosilicon compound (2) is employed in proportions sufficient to provide 0.1 to 1.2 gram equivalent silicon atoms of amino substituted organic silicon compound (2) per gram equivalent hydroxyl group in the diorganopolysiloxane (1). About 0.2 to 2.0% by weight of said silicon compound (2) calculated on the total weight of (1)+(2)+(3) and the fillers which may be used.

The reaction of the hydroxyl endblocked diorganopolysiloxane (1) with the amino substituted organic silicon compound (2) is carried forward by mixing the reactants at room-temperature (i.e. 15°–30° C.) and normal pressure (i.e. about 760 mm. Hg). Higher and lower temperatures and pressures can be used, if desired, but to little advantage. The reaction proceeds with amines released during the reaction. The amines can be removed but this is not necessary. The reaction is usually completed within 24 hours and may be completed within 10 minutes. The products of reaction are diorganopolysiloxanes displaying at least some nitrogen atoms as the reactive endgroups.

After reaction of the hydroxyl endblocked diorganopolysiloxane (1) with (2) the reaction product of (a) the halogenosilane, and (b) the basic compound, the polymer so prepared is admixed with an amino substituted organic silicon compound (3) which has at least three hydrolyzable groups per molecule.

The amino-substituted organosilicon compounds employed herein as ingredient (3) include aminosilanes of the general formula $RSi(NH_{p-1}R'_{3-p})_3$ wherein R, R' and $p$ are as above defined. Examples of such aminosilanes can be found in U.S. Patent 3,032,528, issued May 1, 1962, and incorporated herein by reference. Preferred are those aminosilicon compounds prepared by reacting chlorosilanes of the formula $RSiCl_3$ with cycloalkylamines, particularly cyclohexylamines, in accordance with the copending United States application Serial No. 615,350, filed concurrently (docketed as WG 123), entitled "Room Temperature Vulcanizing Silicone Rubber Stock." The amino-substituted organosilicon compounds described and set forth in German Patent No. 1,191,571, are also useful herein.

The amino-substituted organosilicon compound (3) is employed in proportions such that the silicone rubber stock contains at least 1 gram equivalent of amino substituted organosilicon compound (3) per 1 gram equivalent of hydroxyl groups originally present in the diorganopolysiloxane (1). Preferably, 0.2 to 15 percent by weight of (3) is employed based on the total weight of diorganosiloxane (1) and difunctional aminosilicon compound (2) employed.

The additives which are common to vulcanizable elastomeric materials based on diorganopolysiloxanes, viz., those for reducing compression set, pigments, soluble dyes, aromatics (essential oils), oxidation inhibitors, heat stabilizers, flame inhibitors and snuffers, light protectors, softeners, such as fluid trimethylsiloxy endblocked dimethylpolysiloxane, but especially reinforcing and non-reinforcing fillers can also be used. If some of the Si-bonded organic radicals, i.e., 0.5 to 10 mol. percent of the Si-bonded organic radicals are radicals with aliphatic multiple bonds, particularly vinyl radicals, the use of organic peroxides in quanties of 0.01 to 5% by weight, calculated on the weight of the diorganopolysiloxane is advantageous. Condensation catalysts, such as dibutyl tin dilaurate can also be used.

Examples of reinforcing fillers, i.e., fillers with a surface of more than 50 m.$^2$/g. are fume silicas, silica hydrogels dehydrated while maintaining the structure, i.e., the so-called silica aerogels, and precipitated silica with a large surface area. These fillers can be treated by known methods and display organosiloxy or alkoxy groups at their surface, if desired. Non-reinforcing fillers, i.e., fillers with a surface of less than 50 m.$^2$/g. are, for example, calcium carbonate, diatomaceous earth and quartz flour, asbestos and glass fibers and frit; metal powders such as aluminum or nickel powder and metal oxide powder such as titanium dioxide, ferric oxide, aluminum oxide and zinc oxide with a surface area of less than 50 m.$^2$/g. Mixtures of various fillers can be used. Preferably the fillers are employed in quantities of 5 to 90% by weight, calculated on the total weight of organopolysiloxane and filler.

All of the above materials can be used without special drying, i.e., in their commercial air-dried form, in order to prepare the materials of the present discovery without damaging the storage life of the materials which must obviously be stored with careful exclusion of water.

The materials of the present discovery can be dissolved or dispersed in inert solvents, i.e., those which do not attack the Si-N bond, in hydrocarbons such as benzene, toluene, xylene or petroleum ether; ethers such as diethyl ether and dibutyl ether; and ketones such as methylisobutyl ketone, or they can be mixed with such solvents.

The materials of the present discovery can be stored in the absence of water; they will cure at room-temperature from the effect of water, the normal water content of the air is sufficient for this. In addition, to the water present in the air, water from another source such as tap water, water vapor and water from crystal water containing compounds or a compound containing another hydroxyl group can be used to cure the materials of the present discovery to elastomers. The curing can also be conducted at higher temperatures than room temperature, if desired. It will then proceed more rapidly.

The elastomers prepared from the materials of the present discovery will adhere firmly to a great variety of materials such as glass, porcelain, wood, plaster, concrete, stucco, metals, organic and organosilicon plastics. The materials of the present discovery are, therefore, very suitable for adhesives or putties, e.g. for adhering organopolysiloxane elastomers obtained by other methods to other materials such as steel and glass; for sealing joints, e.g. for buildings, aircraft and motor vehicles, as well as dental closures, pouring materials and as coating lacquers. They are, furthermore, suitable for any purposes in which diorganopolysiloxane-based room-temperature curing elastomers are commonly used, e.g. as protective coatings, for electrical and thermal insulation, for preparing impressions, for coating textiles or paper, as well as for preparing sheets, castings and laminates.

The following examples are included herein to assist those skilled in the art to fully understand and practice the invention. The scope of the invention is defined in the claims and is not limited by the following examples. The reactions set forth in the examples were carried forward at room-temperature (about 18° C.) and normal pressure (about 760 mm. Hg) unless otherwise stated. All viscosities were measured at 25° C.

EXAMPLE 1

(a) A 4 liter flask was fitted with a stirrer, a calcium chloride tube, thermometer and dropping funnel and 12.9 g. (0.1 mol) of dimethyldichlorosilane was added dropwise with concurrent stirring at −5° to 10° C. to a solution of 39.68 g. (0.4 mol) cyclohexylamine in 1000 ml. of dry toluene. After addition was completed, the reaction mass was stirred until the contents of the flask warmed up to room-temperature. The reaction mass was then filtered separating the fluid from the amine salt produced during the reaction. The toluene was removed from the filtrate by distillation at a hot-bath temperature of 50° to 80° C. and 12 mm. of Hg. The residue so obtained was analyzed by elemental analysis and was found to be essentially dimethyl bis-(cyclohexylamino)silane, $$(CH_3)_2Si(NHC_6H_{11})_2$$

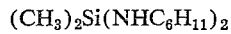

(b) Repeating the procedure of (a) above employing 0.1 mol CH$_3$SiCl$_3$ and 0.6 mol n-butylamine, there was obtained a fluid identified by elemental analysis as consisting essentially of methyl tris(n-butylamino)silane.

(c) A mixture was prepared employing 40 g. of a 100,000 cs. viscosity hydroxyl endblocked dimethylpolysiloxane, 10 g. of a 50 cs. viscosity trimethylsiloxy endblocked dimethylpolysiloxane, 50 g. quartz flour and 2 g. fume silica and 0.5 ml. of the fluid prepared in (a) above was added thereto. After 45 minutes the mixture thus obtained is further mixed with 3 ml. of the fluid prepared in (b) above. The fillers were not predried, but are employed in their air-dried form.

On zinc, brass, smooth plaster surfaces and a polycondensation product of hexamethylenediamine and adipic acid commercially available as Nylon 66, the material prepared in (c) above, vulcanized and cured to form a firmly adherent elastomer. A control material prepared without the fluid prepared in (a) above, but otherwise identical to the material prepared in (c) vulcanized and cured on the substrates, but did not adhere thereto without a primer and were inferior in tear strength to the rubber prepared in (c).

The material prepared in (c) and the control material noted above were stored in standard tubes employed for commercial sale of RTV rubber. The material prepared in (c) remained unchanged and workable after storage for three weeks, whereas the control material was almost completely hardened after 3 weeks' storage.

EXAMPLE 2

(d) The procedure described in Example 1, under (a) is repeated but instead of the 0.4 mol cyclohexylamine, 0.4 mol of n-butylamine is used. The fluid obtained was identified as essentially dimethyl bis-(n-butylamino)silane.

(e) The procedure described in Example 1 under (a) is repeated, but instead of the 0.4 mol cyclohexylamine 0.6 mol cyclohexylamine is used and in place of the 0.1 mol of dimethyldichlorosilane 0.1 mol of methyltrichlorosilane is used. A fluid is obtained consisting essentially of methyl tris(cyclohexylamino)silane.

(f) 0.5 g. of the fluid consisting essentially of dimethyl bis-(n-butylamino)silane is mixed with a mixture of 50 g. of a 150,000 cs. hydroxyl endblocked dimethylpolysiloxane, and 5 g. of fume silica. After 30 minutes the mixture thus obtained is mixed with 2 g. of the fluid consisting essentially of methyl tris-(cyclohexylamino)silane.

In the air, the material hardens to an elastomer with a resistance to tear propagation, determined by DIN 53,507, of 8.8 kg./cm. while a control which was prepared without dimethyl bis-(n-butylamino)silane in an otherwise unaltered procedure hardened to an elastomer with a resistance to tear propagation of 3.2 kg./cm.

The material of the present discovery is very suitable for adhering acrylic glass while the control is too cloudy for this purpose because of its transparency.

EXAMPLE 3

Equivalent results were achieved when Example 1(c) was repeated employing in place of the mixture of the 100,000 cs. viscosity hydroxyl endblocked dimethylpolysiloxane and 50 cs. viscosity trimethylsiloxy endblocked dimethylpolysiloxane any of the following: a 2,000 cs. viscosity hydroxyl endblocked dimethylsiloxane polymer; a 500,000 cs. viscosity dimethylsiloxane polymer having hydroxyl endblocks; 50,000 cs. viscosity polymers having hydroxyl endblockers and containing any combination of at least 50 mol percent dimethylsiloxane units and vinylmethylsiloxane units, phenylmethylsiloxane units, phenylvinylsiloxane units, 3,3,3-trifluoropropylmethylsiloxane units and butylphenylsiloxane units; a mixture of 40 parts by weight of 100,000 cs. viscosity hydroxyl endblocked dimethylsiloxane and 20 parts by weight of 50 cs. dimethylpolysiloxane having a hydroxyl endblock and a trimethylsiloxy endblock on the alpha and omega silicon atom respectively in each molecule; a 100,000 cs. hydroxyl endblocked copolymer of 99.9 mol percent dimethylsiloxane units and 0.1 mol percent $CH_3(HO)SiO$ units.

EXAMPLE 4

Equivalent results are achieved when Example 1(a) is repeated employing in place of the 0.1 mol of dimethyldichlorosilane, 0.1 mol of any of the following: dimethyldibromosilane, dimethyldifluorosilane, dimethyldiiodosilane, dimethylchlorobromosilane, dimethylchloroiodosilane, diphenyldichlorosilane, dibutyldichlorosilane, vinylmethyldichlorosilane, hexylmethyldichlorosilane, 3,3,3-trifluoropropylmethyldichlorosilane and mixtures thereof and in place of the cyclohexylamine, 0.4 mol of any of the following: ammonia, n-butylamine, tert-butylamine, 3,5,5-trimethylcyclohexylamine, 2,3,3-triethylcyclohexylamine, and the secondary amines equivalent thereto.

That which is claimed is:

1. A composition of matter admixed in the substantial absence of water consisting essentially of (A) a diorganopolysiloxane prepared by reacting (1) a hydroxyl endblocked diorganopolysiloxane where the organo group is a monovalent radical selected from the group consisting of hydrocarbon, halogenohydrocarbon and cyanoalkyl radicals with (2) an amino substituted organosilicon compound prepared by reacting (a) a silane of the general formula $R_2SiX_2$ wherein each R is a monovalent radical selected from the group consisting of hydrocarbon radicals, halogenohydrocarbon radicals and cyanoalkyl radicals and X is a halogen atom with (b) a basic compound selected from the group consisting of ammonia, primary amines and secondary amines, the basic compound (b) being employed in molar proportion sufficient to react with all the halogen atoms present in silane (a) and (B) an amino substituted organosilicon compound which is selected from the group consisting of
   (i) aminosilanes of the general formula $$RSi(NH_{p-1}R'_{3-p})_3$$

where each R is a monovalent radical selected from the group consisting of hydrocarbon, halogenohydrocarbon and cyanoalkyl radicals, each R' is a monovalent radical free of aliphatic unsaturation and p is 1, 2 or 3, (ii) silylamines prepared by reacting a chlorosilane of the formula $RSiCl_3$ with a cycloalkylamine of 5 to 12 carbon atoms, where R is as above defined, and
   (iii) the reaction product of a polyfunctional organosilicon compound selected from the group consisting of silanes of the general formula $R_mSi(OR')_{4-m}$ were R and R' are as defined above and m has a value of 0 or 1 and liquid partial hydrolyzates thereof and diethanolamine.

2. A composition in accordance with claim 1 further characterized in that the hydroxyl endblocked diorganopolysiloxane reactant (A) (1) is defined by the general formula $(HO)_x(R_ySiO_{4-y/2})_nH$ where each R is a monovalent radical selected from the group consisting of hydrocarbon, halogenohydrocarbon and cyanoalkyl radicals, x has an average value of from 0.99 to 1.01, y has an average value of from 1.99 to 2.01, x+y is 3.0, and n is a whole number in the range from 3 to 2,000.

3. A composition in accordance with claim 1 further characterized in that
   (a) the silane of the general formula $R_2SiX_2$ is reacted with
   (b) a basic compound represented by the general formula $NH_pR'_{3-p}$, where R' is a monovalent hydrocarbon radical free of aliphatic unsaturation and p is 1, 2 or 3.

4. A composition in accordance with claim 2 further characterized in that
   (a) the silane of the general formula $R_2SiX_2$ is reacted with
   (b) a basic compound represented by the general formula $NH_pR'_{3-p}$ where R' is a monovalent hydrocarbon radical free of aliphatic unsaturation and p is 1, 2 or 3.

5. A composition in accordance with claim 2 where R is $CH_3$.

6. A composition in accordance with claim 3 where R is $CH_3$ and R' is n-butyl or cyclohexyl.

7. A composition in accordance with claim 4 where R is $CH_3$ and R' is n-butyl or cyclohexyl.

8. A composition of matter admixed in the substantial absence of moisture characterized in that it consists essentially of
   (A) a diorganopolysiloxane prepared by reacting
      (1) a hydroxyl endblocked essentially linear organopolysiloxane of the general formula $$(HO)_x(R_ySiO_{4-y/2})_nH$$

where each R is a monovalent radical selected from the group consisting of hydrocarbon, halogenohydrocarbon and cyanoalkyl radicals, x has an average value of from 0.99 to 1.01, y has an average value of from 1.99 to 2.01 and n has a value of from 50 to 2,000, with
      (2) 0.2 to 2.0% by weight based on the weight of the composition of an amino substituted organosilicon compound prepared by reacting
         (a) a silane of the general formula $R_2SiX_2$ where R is as above defined and X is a halogen atom with
         (b) a basic compound represented by the general formula $NH_pR'_{3-p}$ wherein each R' is a monovalent hydrocarbon radical free of aliphatic unsaturation and p is 1, 2 or 3, the basic compound (b) being employed in molar proportion sufficient to react with all the halogen atoms present in the silane (a) and the reaction of (a) with (b) being carried forward at a temperature in the range from −10° C. to +10° C. and
   (B) an aminosilane of the general formula $$RSi(NH_{p-1}R'_{3-p})_3$$

where R, R' and p are as above defined or a reaction product of an organotrihalogenosilane of the formula RSiX$_3$ with a cycloalkylamine containing 5 to 12 carbon atoms, said aminosilicon compound (B) being present in amount sufficient to provide at least 1 gram equivalent of said aminosilicon compound (B) per gram equivalent of hydroxyl groups present in the organopolysiloxane reactant (A) (1).

9. The composition of claim 8 further characterized in that (B) is present to the extent of 0.2 to 15% by weight based on the total weight of diorganopolysiloxane (A).

10. The composition of claim 8 further characterized in that R is CH$_3$, X is chlorine and R' is $n$ butyl or cyclohexyl.

11. The method of preparing a cured elastomer comprising contacting the composition of claim 1 with fluid water.

12. The method of preparing a cured elastomer comprising contacting the composition of claim 8 with fluid water.

13. The method of preparing a cured elastomer comprising contacting the composition of claim 10 with fluid water.

References Cited

UNITED STATES PATENTS

| | | | |
|---|---|---|---|
| 2,579,418 | 12/1951 | Cheronis | 260—2 |
| 2,885,370 | 5/1959 | Groszos et al. | 260—2 |
| 3,032,528 | 5/1962 | Nitzsche et al. | 260—46.5 |
| 3,043,798 | 7/1962 | Boyer et al. | 260—2 |
| 3,243,404 | 3/1966 | Martellock | 260—46.5 |

FOREIGN PATENTS

| | | |
|---|---|---|
| 1,024,234 | 3/1966 | Great Britain. |
| 1,120,690 | 12/1961 | Germany. |

DONALD E. CZAJA, *Primary Examiner.*

M. I. MARQUIS, *Assistant Examiner.*